United States Patent
Hwang et al.

(10) Patent No.: US 8,867,119 B2
(45) Date of Patent: Oct. 21, 2014

(54) HEAT RESISTIVE PARTICLES FOR PARTICLE-BASED DISPLAYS AND FABRICATION METHODS THEREOF

(71) Applicant: Delta Electronics, Inc., Taoyuan Hsien (TW)

(72) Inventors: Jiunn-Jye Hwang, Taoyuan Hsien (TW); Jung-Yang Juang, Taoyuan Hsien (TW); Rong-Chang Liang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 53 days.

(21) Appl. No.: 13/646,214

(22) Filed: Oct. 5, 2012

(65) Prior Publication Data
US 2013/0088768 A1    Apr. 11, 2013

Related U.S. Application Data

(60) Provisional application No. 61/544,850, filed on Oct. 7, 2011.

(51) Int. Cl.
| | |
|---|---|
| G02B 26/00 | (2006.01) |
| G02F 1/167 | (2006.01) |
| C08K 3/22 | (2006.01) |
| C08K 5/01 | (2006.01) |
| C08K 5/00 | (2006.01) |
| C08K 3/36 | (2006.01) |
| C08L 33/08 | (2006.01) |

(52) U.S. Cl.
CPC ............. *C08L 33/08* (2013.01); *G02F 1/167* (2013.01); *C08K 3/22* (2013.01); *G02F 2001/1678* (2013.01); *C08K 5/01* (2013.01); *C08K 5/0041* (2013.01); *C08K 3/36* (2013.01)
USPC ......................................................... 359/296

(58) Field of Classification Search
CPC ..................................................... G02F 1/172
USPC ......................................................... 359/296
See application file for complete search history.

(56) References Cited

U.S. PATENT DOCUMENTS

2012/0329356 A1*   12/2012   Liang et al. ................... 445/25

* cited by examiner

*Primary Examiner* — James Jones
(74) *Attorney, Agent, or Firm* — Muncy, Geissler, Olds & Lowe, P.C.

(57) ABSTRACT

A heat resistive particle for a particle-based display and a fabrication method thereof are provided. The heat resistive particle includes a near infrared absorption resistive additive mixed with a polymer resin, having a relative absorption ratio at a near infrared light wavelength range of at least less than 50% based on the maximal absorptivity at a visible light wavelength range. The method includes mixing a near infrared absorption resistive additive with a polymer resin to form a plurality of heat resistive particles by a chemical synthesis or a pulverization method. Further, a switchable particle-based display is provided, having a plurality of display units, wherein each display unit includes one or more cells. A plurality of particles is filled into the one or more cells of each display unit, wherein at least a part of the particles includes the heat resistive particles.

33 Claims, 1 Drawing Sheet

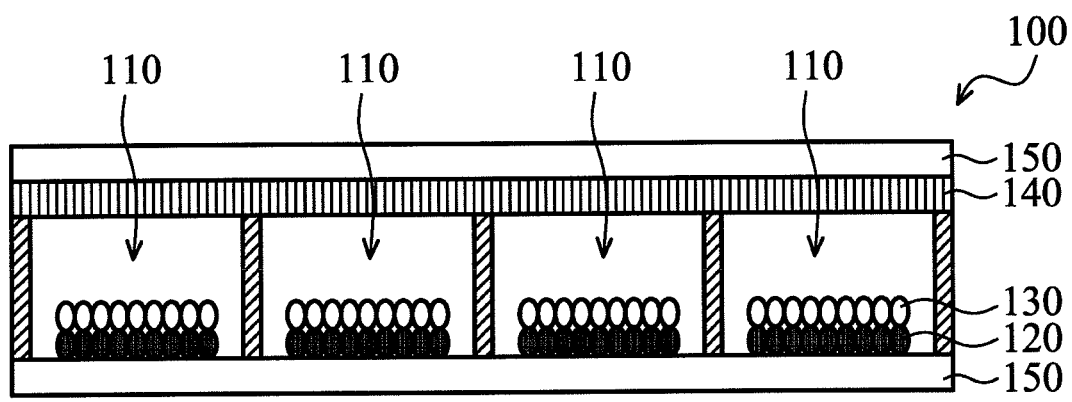

HEAT RESISTIVE PARTICLES FOR PARTICLE-BASED DISPLAYS AND FABRICATION METHODS THEREOF

CROSS REFERENCE TO RELATED APPLICATIONS

This application claims the benefit of U.S. Provisional Application No. 61/544,850, filed on Oct. 7, 2011, the entirety of which is incorporated by reference herein.

BACKGROUND OF THE INVENTION

1. Field of the Invention

The present invention relates to a display media of a particle-based display, and in particular, relates to a heat resistive particle for a particle-based display.

2. Description of the Related Art

Particle-based display (PBD) technology has drawn a great deal of attention in the display industry in recent years. Due to its wide viewing angles, low power consumption, light weight, and thinness, PBDs have widely been applied in a variety of areas, for example, in electronic readers, electronic paper, electronic tags, electronic signage, and the like. PBDs are capable of providing visual effects which are similar to that of reading paper. Different from backlight-type flat panel displays, PBDs utilize reflected ambient light from pigment particles to display content, and thus, there is no glare or other effects resulting from strong external light which may negatively affect reading. In addition, PBDs consume power only when the displayed contents are subjected to change.

A PBD includes a plurality of independently addressable display units spatially arranged in the form of a matrix. Each display unit is formed with a plurality of display cells, where each display cell is filled with pigment particles. Each display unit is disposed between a pair of opposed, spaced-apart substrates, and electrodes disposed on at least one substrate. When, by applying voltages onto the electrodes, an electric field is generated between the pair of substrates, the charged pigment particles in the cells migrate by attraction to the respective electrodes having opposite polarities. Thus, the locations of the pigment particles can be controlled by changing the polarities of the electrodes, thereby displaying images of the reflected light from the pigment particles or fluid.

Based on media that suspend/disperse the pigment particles in the cells, PBDs can be grouped into electrophoretic displays or dry powder type displays. The pigment particles for the electrophoretic displays and the dry powder type displays are made of polymer resin, which has poor heat resistive ability. Heat is usually produced during the operation of the displays. When polymer resin exists in a high temperature environment, it has some problems such as softening and deformation. A softened polymer resin has viscosity which makes pigment particles adhere with each other, causing particle aggregation. As a result, a response rate of the pigment particles to electric fields is reduced due to the particle aggregation. Furthermore, image displaying ability of the pigment particles would also be lost due to the particle aggregation, which affects the lifespan of particle-based displays.

Sun contains high energy ultraviolet (UV) light and infrared (IR) light, wherein near infrared light is the major heat source coming from the sun. When particle-based displays are operated in an outdoor environment for a long time and irradiated by the sun, the heat coming from sun is absorbed by the pigment particles. The probability that the pigment particles will soften and adhere with each other to cause particle aggregation is significantly increased when irradiated by the sun. Thus, the lifespan of the particle-based displays decreased.

Currently, one method for enhancing heat resistance of pigment particles is to increase a cross-linking density in the structure of the pigment particles. As such, the structural stability and the heat resistance of the pigment particles are enhanced. However, pigment particles with high cross-linking density have some problems when being fabricated, for example, it is difficult to control particle sizes and production yields of the pigment particles are low.

BRIEF SUMMARY OF THE INVENTION

Therefore, it is desired to enhance heat resistive ability of pigment particles for particle-based displays and overcome the above mentioned problems of the existing methods for fabricating the pigment particles with enhanced heat resistance.

The embodiments of the invention provide heat resistive particles for particle-based displays and fabrication methods thereof. The heat resistive particles can be used in both electrophoretic displays and dry powder type displays to increase the lifespan of the particle-based displays. Further, a switchable particle-based display containing the heat resistive particles is provided.

According to an embodiment, a heat resistive particle for a particle-based display is provided. The heat resistive particle includes a polymer resin, and a near infrared absorption resistive additive mixed with the polymer resin. According to the embodiment of the invention, the heat resistive particle has a relative absorption ratio at a near infrared light wavelength range of at least less than 50% based on the maximal absorptivity at a visible light wavelength range.

According to an embodiment, a switchable particle-based display is provided. The switchable particle-based display has a plurality of display units spatially arranged in a matrix form, wherein each display unit includes one or more cells. The switchable particle-based display includes a plurality of particles filled into the one or more cells of each display unit, wherein at least a part of the particles comprises the heat resistive particles as mentioned above.

According to an embodiment, a method of fabricating heat resistive particles for a particle-based display is provided. The method includes mixing a near infrared absorption resistive additive with a polymer resin to form a plurality of heat resistive particles by a chemical synthesis method or a pulverization method, wherein the heat resistive particles have a relative absorption ratio at a near infrared light wavelength range of at least less than 50% based on the maximal absorptivity at a visible light wavelength range.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 1 shows a schematic cross section of a portion of a switchable particle-based display according to an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In order to increase lifespan of particle-based displays, enhancement of heat resistive ability of pigment particles is the key; especially for particle-based displays operating in an outdoor environment, for example electronic signage. For particle-based displays operating in an outdoor environment, the pigment particles exist in an operational environment which is under irradiation from the sun for a long period of time, wherein near infrared light is the major heat source coming from sun. If the pigment particles continuously absorb near infrared light and the particle-based displays further generate heat during operation, the pigment particles will absorb a great amount of heat to make the surface or the structure of the pigment particles soften and produce viscosity. This causes the pigment particles to adhere with each other after a collision to produce particle aggregation. As a result, a response rate of the pigment particles to an electric field is reduced and image displaying ability of the pigment particles is also reduced. Among various colors of the pigment particles, the negative effect of heat to dark colored pigment particles, especially to black pigment particles, is significant. Therefore, how to reduce absorption of near infrared light of pigment particles is a key point when trying to enhance heat resistive ability of pigment particles.

Currently, dark colored colorants for fabricating pigment particles, for example a black colored colorant is mainly made of carbon black. Although the carbon black colorant has an excellent covering ability and physical stability, the carbon black colorant will absorb a great amount of heat to increase the probability of pigment particles softening and deforming due to heat absorption. An embodiment of the invention uses a colorant or other additives with a low near infrared absorption instead of the carbon black colorant, such that the heat produced from absorbing near infrared light is reduced. As such, the heat resistive ability of the pigment particles is enhanced and the lifespan of the particle-based displays is also increased.

The embodiments of the invention provide heat resistive particles for particle-based displays and fabrication methods of the heat resistive particles. The heat resistive particles includes a polymer resin and a near infrared absorption resistive additive mixed with the polymer resin, wherein the polymer resin may be about 98-50% by weight and the near infrared absorption resistive additive may be about 1-20% by weight. The near infrared absorption resistive additive having a character of low near infrared absorption may be a colorant, such as a pigment or a dye, other organic materials or inorganic powders. The near infrared absorption resistive colorant having a character of low near infrared absorption can be classed as two types. One is a near infrared transparent colorant and the other is a near infrared reflective colorant.

Most near infrared transparent colorants are made of organic materials, such as black perylene-based pigment, anthraquinone, phthalocyanine, perinone, perylene, indigo, thioindigo, dioxazine, quinacridone, isoindolinone, diketopyrrolopyrrole, azomethine, azo, the derivatives thereof or the combinations thereof, or other compounds with a character of low near infrared absorption. In the embodiments of the invention, the near infrared transparent colorant is for example a Lumogen colorant (commercially available from BASF), Heliogen pigments (commercially available from BASF), Paliogen pigments (commercially available from BASF), Paliotol pigments (commercially available from BASF), the derivatives thereof or the combinations thereof.

The near infrared reflective colorant can be formed of an inorganic powder having a high refractive index mixed with a dye or a pigment, wherein the inorganic powder is about 1-20% by weight on basis of a near infrared light reflective dye, and the dye or the pigment is about 80-95% by weight on basis of the near infrared light reflective dye. The inorganic powder having high refractive index can reflect near infrared light, wherein the refractive index is in a range about 2.0 to 4.0. The inorganic powder is for example titanium dioxide, zinc oxide, aluminum oxide, silica, the derivatives thereof or the combinations thereof, or other compounds with high reflection ability for near infrared light. The dye or the pigment used for the near infrared reflective colorant can be an organic material or an inorganic material, such as copper oxide, manganese dioxide, iron oxide, black perylene-based pigment, anthraquinone, phthalocyanine, perinone, perylene, indigo, thioindigo, dioxazine, quinacridone, isoindolinone, diketopyrrolopyrrole, azomethine, azo, the derivatives thereof or the combinations thereof, or other compounds with a character of low near infrared absorption. In the embodiments of the invention, the dye or the pigment used for the near infrared reflective colorant is for example Sicopal pigments (commercially available from BASF), Sicotan pigments (commercially available from BASF), Cool Colors (commercially available from Ferro Corp), the derivatives thereof or the combinations thereof.

In the embodiments of the invention, the heat resistive particles can be fabricated by mixing the near infrared absorption resistive additive with polymer resin to form a plurality of heat resistive particles by a chemical synthesis method or a pulverization method. The pulverization method includes, but is not limited to, a ball milling process, a bead milling process or a jet milling process. The chemical synthesis method includes, but is not limited to, emulsion polymerization, suspension polymerization or dispersion polymerization. The resulting heat resistive particles have a diameter of about 0.01-20 µm, and preferably about 0.1-10 µm.

The polymer resin includes, but is not limited to, styrene resin, polyamide(nylon)resin, acrylic(acrylate)resin, polyurethane resin, urea resin, polyester resin, epoxy resin, melamine resin, phenol resin, the derivatives thereof or the combinations thereof, wherein styrene resin and acrylic resin are preferred. The ratio of the polymer resin may be about 98-50% by weight, and preferably about 95-65% by weight. The near infrared absorption resistive additive is as mentioned above, thus, a description thereof will not be repeated again for brevity. The ratio of the near infrared absorption resistive additive may be about 1-20% by weight, and preferably about 1-10% by weight.

In addition, a light stabilizer and a charge controlling agent can be mixed with the polymer resin and the near infrared absorption resistive additive to form the heat resistive particles. The ratio of the light stabilizer may be about 0-10% by weight, and preferably about 0.1-5% by weight. The ratio of the charge controlling agent may be 0-25% by weight, and preferably about 0-10% by weight. The light stabilizer includes, but is not limited to, salicylate, benzophenone, hindered amine, quinine, nitrobenzene, perylene diimide, aromatic amine, benzotriazole, the derivatives thereof or the combinations thereof. The charge controlling agent includes, but is not limited to, nigrosine, triphenylmethane, quaternary ammonium salt, metal complex with sulfonate and carboxylic acid, silane, carboxylic acid, carboxylate salt, sulfonic acid, sulfonate salt, amine, thiophene, pyridine, the derivatives thereof or the combinations thereof.

Examples of fabricating heat resistive particles according to the embodiments of the invention are described as below.

Example 1

90 g of a copolymer of acrylate resin (CM 205, Chimei) and vinyl pyridine (Sigma-Aldrich), 5 g of a charge controlling agent (Bontron N75, Orient), and 5 g of a colorant of Lumogen FK4280 (BASF) were mixed and added in a twin screw extruder (MPV 2015, APV) to make a composite resin, which was then milled by a milling process (LJ3, NPK) to obtain particles with a particle size ($D_{50}$) of about 2.5 µm. As a result, the fabrication of heat resistive particles of Example 1 for particle-based displays was completed.

Example 2

90 g of a copolymer of acrylate resin (CM 205, Chimei) and vinylbenzyl trimethylammonium chloride (Sigma-Aldrich), 5 g of a charge controlling agent (Bontron N07, Orient), and 5 g of a colorant of Sicopal K0095 (BASF) were mixed and added in a twin screw extruder (MPV 2015, APV) to make a composite resin, which was then milled by a milling process (LJ3, NPK) to obtain particles with a particle size ($D_{50}$) of about 3 µm. As a result, the fabrication of heat resistive particles of Example 2 for particle-based displays was completed.

As the above described, in the fabrication of the heat resistive particles, the near infrared absorption resistive additive is introduced into the structure of the heat resistive particles. Therefore, the near infrared absorption ratio of the heat resistive particles is reduced effectively, which helps to enhance the heat resistive ability of the pigment particles for particle-based displays.

In the embodiments of the invention, the color of the heat resistive particles for particle-based displays can be black, cyan, blue, green, red, magenta or yellow. The heat resistive particles of the above mentioned colors have a relative absorption ratio at a near infrared light wavelength range (800-2000 nm) of at least less than 50% based on the maximal absorptivity at a visible light wavelength range.

In one embodiment, the color of the heat resistive particles for particle-based displays is black. The black heat resistive pigment particles have a relative absorption ratio at a near infrared light wavelength range of less than 50%, preferably less than 35%, and more preferably less than 20%, based on the maximal absorptivity of the black heat resistive pigment particles at a visible light wavelength range.

In one embodiment, the color of the heat resistive particles for particle-based displays is cyan. The cyan heat resistive pigment particles have a relative absorption ratio at a near infrared light wavelength range of less than 50%, preferably less than 35%, and more preferably less than 20%, based on the maximal absorptivity of the cyan heat resistive pigment particles at a visible light wavelength range.

In other embodiments, the color of the heat resistive particles for particle-based displays is blue or green. The blue and green heat resistive pigment particles have a relative absorption ratio at a near infrared light wavelength range of less than 50%, preferably less than 35%, and more preferably less than 25%, based on the maximal absorptivity of the blue and green heat resistive pigment particles at a visible light wavelength range.

In other embodiments, the color of the heat resistive particles for particle-based displays is red, magenta or yellow. The red, magenta and yellow heat resistive pigment particles have a relative absorption ratio at a near infrared light wavelength range of less than 50%, preferably less than 35%, and more preferably less than 25%, based on the maximal absorptivity of the red, magenta and yellow heat resistive pigment particles at a visible light wavelength range.

In the embodiments of the invention, the heat resistive particles are used for switchable particle-based displays. The switchable particle-based display has a plurality of display units spatially arranged in a matrix form, wherein each display unit comprises one or more cells. Referring to FIG. 1, a schematic cross section of a display unit 100 of a switchable particle-based display according to an embodiment of the invention is shown. In this embodiment, each display unit 100 contains four cells 110. In other embodiments, each display unit of a switchable particle-based display may contain one, two, three or other amounts of cells. Each cell 110 is filled with a plurality of pigment particles 120 and 130, wherein at least a part of the pigment particles 120 and 130 are provided from the heat resistive particles of the embodiments of the invention. As mentioned above, the heat resistive particles contain the near infrared absorption resistive additive which can reduce softening and deforming of the pigment particles under thermal radiation.

In an embodiment, the color of the pigment particles 120 is black and the color of the pigment particles 130 is white, wherein the black pigment particles 120 are provided from the heat resistive particles of the embodiments of the invention. In another embodiment, the color of the pigment particles 120 and 130 is black, cyan, blue, green, red, magenta or yellow. In this embodiment, the black, cyan, blue, green, red, magenta or yellow pigment particles 120 and 130 all are provided from the heat resistive particles of the embodiments of the invention.

The switchable particle-based display 100 can be an electrophoretic display or a dry powder type display. In the electrophoretic display, the pigment particles 120 and 130 are suspended in a dielectric solvent. In the dry powder type display, the pigment particles 120 and 130 are floating in air. The display units 110 of the switchable particle-based display are sealed by a sealing layer 140 between two electrode plates 150. As such, when different voltages are applied to the electrode plates 150, electric fields are generated therebetween, and the pigment particles 120 and 130 will move accordingly, thereby achieving image displaying.

According to the embodiments of the invention, at least a part of the pigment particles for switchable particle-based displays are provided from the heat resistive particles which contain the near infrared absorption resistive additive. Therefore, near infrared absorption of the pigment particles which are provided from the heat resistive particles of the embodiments is reduced and thereby heat resistive ability of the pigment particles is enhanced.

According to the heat resistive particles of the embodiments, the near infrared absorption resistive additive can prevent the pigment particles from softening and deforming, avoiding aggregation of the pigment particles. As a result, for application in switchable particle-based displays, response rate of the heat resistive pigment particles to electric fields and image displaying ability of the heat resistive pigment particles are enhanced.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A heat resistive particle for a particle-based display, comprising:
   a polymer resin; and
   a near infrared absorption resistive additive mixed with the polymer resin,
   wherein the heat resistive particle has a relative absorption ratio at a near infrared light wavelength range of at least less than 50% based on the maximal absorptivity at a visible light wavelength range.

2. The heat resistive particle of claim 1, wherein the polymer resin is 98-50% by weight and the near infrared absorption resistive additive is 1-20% by weight.

3. The heat resistive particle of claim 1, wherein the near infrared absorption resistive additive comprises a near infrared transparent colorant or a near infrared reflective colorant.

4. The heat resistive particle of claim 3, wherein the near infrared transparent colorant comprises an organic material selected from a group consisting of black perylene-based pigment, anthraquinone, phthalocyanine, perinone, perylene, indigo, thioindigo, dioxazine, quinacridone, isoindolinone, diketopyrrolopyrrole, azomethine, azo, the derivatives thereof and the combinations thereof.

5. The heat resistive particle of claim 3, wherein the near infrared reflective colorant comprises an inorganic powder mixed with a dye or a pigment, and the inorganic powder has a refractive index of 2.0 to 4.0 at a near infrared light wavelength range.

6. The heat resistive particle of claim 5, wherein the inorganic powder is selected from a group consisting of titanium dioxide, zinc oxide, aluminum oxide, silica and the combinations thereof.

7. The heat resistive particle of claim 5, wherein the dye or the pigment is selected from a group consisting of copper oxide, manganese dioxide, iron oxide, black perylene-based pigment, anthraquinone, phthalocyanine, perinone, perylene, indigo, thioindigo, dioxazine, quinacridone, isoindolinone, diketopyrrolopyrrole, azomethine, azo, the derivatives thereof and the combinations thereof.

8. The heat resistive particle of claim 1, having a relative absorption ratio at a near infrared light wavelength range of less than 35% based on the maximal absorptivity at a visible light wavelength range.

9. The heat resistive particle of claim 1, having a color of black, cyan, blue, green, red, magenta or yellow.

10. The heat resistive particle of claim 9, wherein the black and the cyan heat resistive particles have a relative absorption ratio at a near infrared light wavelength range of less than 20% based on the maximal absorptivity at a visible light wavelength range.

11. The heat resistive particle of claim 9, wherein the blue, the green, the red, the magenta and the yellow heat resistive particles have a relative absorption ratio at a near infrared light wavelength range of less than 25% based on the maximal absorptivity at a visible light wavelength range.

12. The heat resistive particle of claim 1, further comprising a light stabilizer and a charge controlling agent, wherein the light stabilizer is 0-10% by weight and the charge controlling agent is 0-25% by weight.

13. The heat resistive particle of claim 1, wherein the polymer resin is selected from a group consisting of styrene resin, polyamide resin, acrylic resin, polyurethane resin, urea resin, polyester resin, epoxy resin, melamine resin, phenol resin, the derivatives thereof and the combinations thereof.

14. The heat resistive particle of claim 1, having a diameter of 0.01-20 μm.

15. A switchable particle-based display, having a plurality of display units spatially arranged in a matrix form, wherein each display unit comprises one or more cells, comprising:
   a plurality of particles filled into the one or more cells of each display unit,
   wherein at least a part of the particles comprises the heat resistive particles of claim 1.

16. The switchable particle-based display of claim 15, comprising an electrophoretic display or a dry powder type display.

17. The switchable particle-based display of claim 16, wherein the electrophoretic display comprises the plurality of particles suspended in a dielectric solvent.

18. The switchable particle-based display of claim 16, wherein the dry powder type display comprises the plurality of particles floating in air.

19. A method of fabricating heat resistive particles for a particle-based display, comprising:
   mixing a near infrared absorption resistive additive with a polymer resin to form a plurality of heat resistive particles by a chemical synthesis method or a pulverization method,
   wherein the heat resistive particles have a relative absorption ratio at a near infrared light wavelength range of at least less than 50% based on the maximal absorptivity at a visible light wavelength range.

20. The method of claim 19, wherein the pulverization method comprises a ball milling, a bead milling or a jet milling process.

21. The method of claim 19, wherein the chemical synthesis method comprises emulsion polymerization, suspension polymerization or dispersion polymerization.

22. The method of claim 19, wherein the polymer resin is selected from a group consisting of styrene resin, polyamide resin, acrylic resin, polyurethane resin, urea resin, polyester resin, epoxy resin, melamine resin, phenol resin, the derivatives thereof and the combinations thereof.

23. The method of claim 19, wherein the near infrared absorption resistive additive comprises a near infrared transparent colorant or a near infrared reflective colorant.

24. The method of claim 23, wherein the near infrared transparent colorant comprises an organic material selected from a group consisting of black perylene-based pigment, anthraquinone, phthalocyanine, perinone, perylene, indigo, thioindigo, dioxazine, quinacridone, isoindolinone, diketopyrrolopyrrole, azomethine, azo, the derivatives thereof and the combinations thereof.

25. The method of claim 23, wherein the near infrared reflective colorant comprises an inorganic powder mixed with a dye or a pigment, and wherein the inorganic powder has a refractive index of 2.0 to 4.0 at a near infrared light wavelength range.

26. The method of claim 25, wherein the inorganic powder is selected from a group consisting of titanium dioxide, zinc oxide, aluminum oxide, silica and the combinations thereof.

27. The method of claim 25, wherein the dye or the pigment is selected from a group consisting of copper oxide, manganese dioxide, iron oxide, black perylene-based pigment, anthraquinone, phthalocyanine, perinone, perylene, indigo, thioindigo, dioxazine, quinacridone, isoindolinone, diketopyrrolopyrrole, azomethine, azo, the derivatives thereof and the combinations thereof.

28. The method of claim 19, wherein the heat resistive particles have a diameter of 0.01-20 μm.

29. The method of claim 19, wherein the color of the heat resistive particles is black, cyan, blue, green, red, magenta or yellow.

30. The method of claim 29, wherein the black and the cyan heat resistive particles have a relative absorption ratio at a near infrared light wavelength range of less than 20% based on the maximal absorptivity at a visible light wavelength range.

31. The method of claim 29, wherein the blue, the green, the red, the magenta and the yellow heat resistive particles have a relative absorption ratio at a near infrared light wavelength range of less than 25% based on the maximal absorptivity at a visible light wavelength range.

32. The method of claim 19, further comprising mixing a light stabilizer and a charge controlling agent with the polymer resin, wherein the light stabilizer is 0-10% by weight and the charge controlling agent is 0-25% by weight.

33. A heat resistive particle for a particle-based display, comprising:
  a polymer resin; and
  a near infrared absorption resistive additive mixed with the polymer resin,
  wherein the near infrared absorption resistive additive comprises a near infrared reflective colorant including an inorganic powder mixed with a dye or a pigment, the inorganic powder has a refractive index of 2.0 to 4.0 at a near infrared light wavelength range, and
  wherein the heat resistive particle has a relative absorption ratio at a near infrared light wavelength range of at least less than 50% based on the maximal absorptivity at a visible light wavelength range.

* * * * *